(No Model.)

H. S. HOUGHTON.
GRID FOR COTTON OPENERS.

No. 530,271. Patented Dec. 4, 1894.

Witnesses

Inventor
H. S. Houghton
By Attorney James Shuhy

UNITED STATES PATENT OFFICE.

HENRY S. HOUGHTON, OF NORTHBRIDGE, MASSACHUSETTS.

GRID FOR COTTON-OPENERS.

SPECIFICATION forming part of Letters Patent No. 530,271, dated December 4, 1894.

Application filed May 25, 1894. Serial No. 512,436. (No model.)

*To all whom it may concern:*

Be it known that I, HENRY S. HOUGHTON, a citizen of the United States, residing at Northbridge, in the county of Worcester and State of Massachusetts, have invented certain new and useful Improvements in Grids for Cotton-Openers; and I do declare the following to be a full, clear, and exact description of the invention, such as will enable others skilled in the art to which it appertains to make and use the same.

My invention relates to improvements in that class of grids for cotton openers which comprise toothed grid bars, and it has for its object to provide such a grid comprising bars and teeth upon the bars; the said teeth being provided with long faces or sides and with a blunt, beveled, or curved forward end so as to enable them to separate and straighten the fibers of cotton without cutting or otherwise injuring the same.

With the foregoing end in view, the invention will be fully understood from the following description and claim when taken in connection with the annexed drawings, in which—

Figure 1:
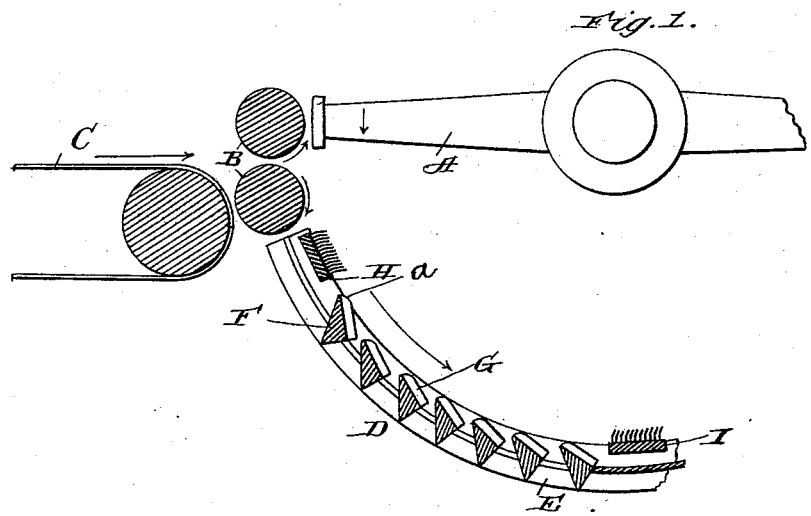
Figure 2:
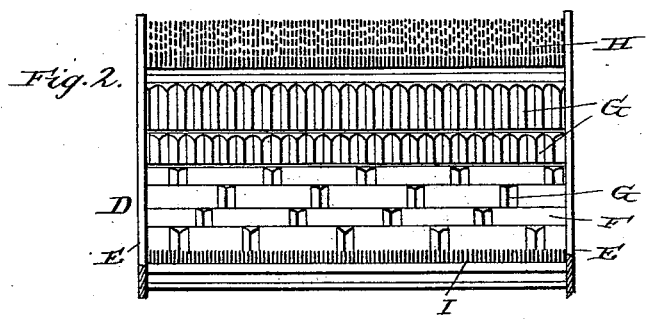
Figure 3:
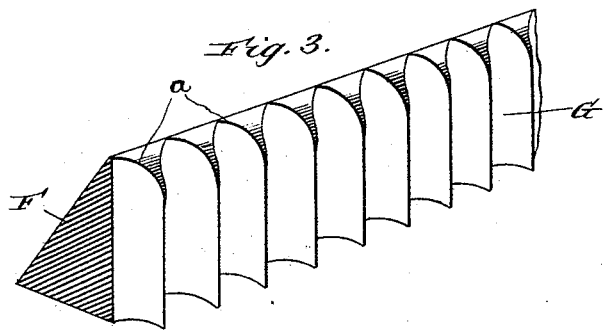

Figure 1, is a vertical section illustrating my improved grid. Fig. 2, is an elevation of the same, and Fig. 3, is an enlarged, detail, perspective view illustrating one of the toothed bars of the grid.

Referring by letter to the said drawings:—A, indicates a rotary beater. B, indicates feed rolls, and C, indicates a feeding apron, all of which may be of the ordinary or any suitable construction; and D, indicates my improved grid which preferably comprises suitable curvilinear side bars E, and transverse bars F; the latter being arranged a slight distance apart as shown, so as to permit of the dirt, seed, &c., in the cotton falling or being drawn between them. The said bars F, are preferably of the form in cross section and are inclined as illustrated and they are provided upon their upper, inner sides with teeth G; the bars adjacent to the feed rolls being preferably provided with a greater number of teeth than those remote from the same as shown. The said teeth G, may be and preferably are formed integral with the bars F, and they extend lengthwise at right angles to the length of the bars and in the direction in which the cotton moves and are provided with long faces or sides and with a blunt, beveled or curved forward end $a$, whereby it will be seen that when the cotton is moved against them by the beater, they will separate and straighten the fibers of the same without catching and tearing, cutting or otherwise injuring the same. It will also be seen that the teeth G, while permitting the dirt, seed, &c., to readily pass between the grid bars, will effectually prevent any material amount of cotton from taking the same course, and will consequently effect a material saving of the same, which is a desideratum.

In conjunction with the toothed bars F, I prefer to employ the primary and secondary combs H, I. These combs which are preferably formed from card clothing may and preferably do have their teeth inclined in the direction in which the cotton moves or perpendicularly as desired, and they are arranged upon opposite sides of the series of grid bars and are preferably connected to the curvilinear bars E, so as to enable the primary comb H, to engage the cotton and straighten or partially straighten the fibers thereof before it reaches the bars F, and the secondary comb I, to engage it after it has passed over the bars.

The combs H, I, in conjunction with the bars having the peculiar teeth G, form a highly efficient grid and one in which the fibers of the cotton will be thoroughly separated and straightened without injuring the same, and in which the dirt and other foreign substance will be allowed a free egress between the bars, while but an immaterial amount of cotton will be wasted. The cotton thus treated is delivered in a good and clean condition to the carding machines, and consequently requires but little carding to render it fit for use which is a desideratum.

Having described my invention, what I claim is—

A grid for cotton openers, comprising a series of transverse bars F, and the teeth G, arranged upon the said bars and extending lengthwise at right angles to the length of the bars and in the direction in which the cotton moves and having the long faces or sides and with the blunt and beveled or curved forward ends a, substantially as and for the purpose set forth.

In testimony whereof I affix my signature in presence of two witnesses.

HENRY S. HOUGHTON.

Witnesses:
CAROLINE R. MASON,
GEORGE W. SPAULDING.